United States Patent [19]
de Vall

[11] Patent Number: 5,541,399
[45] Date of Patent: Jul. 30, 1996

[54] RF TRANSPONDER WITH RESONANT CROSSOVER ANTENNA COIL

[75] Inventor: Franklin B. de Vall, Boulder, Colo.

[73] Assignee: Palomar Technologies Corporation, Carlsbad, Calif.

[21] Appl. No.: 316,698

[22] Filed: Sep. 30, 1994

[51] Int. Cl.⁶ .................................................. G06K 19/06
[52] U.S. Cl. .......................................... 235/491; 343/895
[58] Field of Search .................................... 235/487, 491, 235/492; 343/742, 867, 895

[56] References Cited

U.S. PATENT DOCUMENTS

| | | | |
|---|---|---|---|
| 4,418,411 | 11/1983 | Strietzel | 371/67 |
| 4,567,473 | 1/1986 | Lichtblau | 340/572 |
| 4,598,276 | 7/1986 | Tait | 340/572 |
| 4,716,259 | 12/1987 | Tokura et al. | 174/68.5 |
| 4,730,188 | 3/1988 | Milheiser | 340/825 |
| 4,827,395 | 5/1989 | Anders et al. | 340/572 X |
| 4,962,485 | 10/1990 | Kato et al. | 235/492 X |
| 5,081,445 | 1/1992 | Gill et al. | 340/572 |
| 5,108,822 | 4/1992 | Imaichi et al. | 343/895 X |
| 5,142,270 | 8/1992 | Appalucci et al. | 343/895 X |
| 5,214,410 | 5/1993 | Verster | 340/572 |
| 5,430,447 | 7/1995 | Meier | 342/51 |

FOREIGN PATENT DOCUMENTS 2255692  10/1992  United Kingdom ............ H04B 1/59

*Primary Examiner*—Donald T. Hajec
*Assistant Examiner*—Steven Wigmore
*Attorney, Agent, or Firm*—Rodney F. Brown

[57] ABSTRACT

An RF transponder couples the outer end of a coiled antenna winding to a transponder circuit located inside the winding by a lead line that crosses over the winding turns and is separated from the winding by a dielectric material. The width of the lead line is substantially greater than the antenna line width, yielding capacitances at the cross-over sites that establish a resonant frequency for communicating with the transponder circuit at a predetermined RF frequency. An optional discrete capacitor can also be used to boost the capacitance to a desired level. All of the transponder components are formed on one side of a flexible substrate, the opposite side of which is coated with an adhesive that is covered by a peel-off sheet, allowing the transponder to be affixed to packages as part of a package identification system.

17 Claims, 2 Drawing Sheets

RF TRANSPONDER WITH RESONANT CROSSOVER ANTENNA COIL

BACKGROUND OF THE INVENTION

1. Field of the Invention

This invention relates to RF (radio frequency) transponder systems, and more particularly to transponder systems with a self-resonant antenna implemented on one side of a substrate that can be affixed to an object to be identified.

2. Description of the Related Art

The development of machine readable identification tags for applications such as airport luggage systems and package identification has allowed for more efficient and cost effective identification. Bar-coded labels are most popularly used for this purpose. The labels are flexible and have an adhesive coating on their rear surface that allow them to be applied to objects of many different sizes and shapes. However, bar-code systems have several undesirable limitations. They can be read only along a line-of-sight, require the reader to be positioned relatively close to the label being read, can produce false readings in the case of very dirty or obscure labels, and also require that the reader be properly oriented relative to the label.

RF transponders have also been developed that provide an identification code, or at least an indication of the presence of the transponder. An interrogator transmits an RF signal that is picked up by the transponder antenna. The antenna either powers a circuit that is included in the transponder and retransmits an identification code, or couples back to the interrogator in the case of an "I am here" system in which only the presence of the transponder, not its identification, is sensed. Transponders provide an identification mechanism that can be read even when the transponder is not within the sight of the interrogator, operate at longer ranges than bar code systems, are not subject to errors because of dirt accumulation, and do not require any particular physical orientation between the transponder and the interrogator.

Most transponders consist of a coil of wire that is stuck together during manufacture to form a relatively stiff planar body. A small printed circuit board that includes an IC chip for the identification code, and also a chip capacitor, are glued to the coil, which is then typically laminated between two sheets of plastic to produce a product with an appearance like a credit card. The capacitor is selected so that, together with the coil inductance, it forms a tuned circuit that resonates at the interrogator frequency to enhance the coupling of energy into the transponder circuit. More recently, transponders have been developed in which a capacitor is integrated into the IC chip, rather than as a discrete device. A typical transponder system that transmits an identification code in response to an interrogation signal at its tuned frequency is described in U.S. Pat. No. 4,730,188 to Milheiser.

In the case of an "I am here" transponder system, which is useful for example in electronic article surveillance systems, an aluminum antenna coil has been formed on opposite sides of a dielectric sheet by stamping or embossing, the use of metalized thin films or conductive paints, or bonding pre-cut spiral patterns onto the sheet. The two halves of the coil on opposite sides of the sheet are aligned with each other, producing a self-capacitance that results in resonance at the desired frequency. Such a system is described in U.S. Pat. No. 4,598,276 to Tait. The antenna coil's self-capacitance eliminates the need for a discrete capacitor, or reduces the size of any additional capacitor that may be required.

While transponder systems have advantages over barcode systems in their ability to read an identification code from a distance, a typical transponder is considerably more expensive than a bar-code label, and available transponders cannot easily be affixed to a wide variety of objects with different sizes and shapes.

SUMMARY OF THE INVENTION

The present invention seeks to provide a new type of transponder that retains the advantages of prior transponder systems in reading an identification code at relatively long distances, yet is less costly to manufacture and can be easily attached to many different types of packages to be identified.

These goals are achieved by fabricating a transponder on a single side of a flexible dielectric substrate, with an adhesive on the opposite side of the substrate for adhering the transponder to an object to be identified. A peel-off sheet preferably covers the adhesive until the transponder is placed in use. A self-capacitance is established within the antenna coil by a wide antenna lead for connection to the transponder circuit, and crossing the lead over the much narrower turns of the antenna. The lead is insulated from the underlying antenna turns by a dielectric material, thus forming crossover capacitances that collectively establish the desired antenna resonant frequency.

The total self-capacitance varies with the width of the lead line. If the capacitance is insufficient to establish resonance at the desired frequency, a discrete capacitor can be added to the substrate by a pair of conductive sheets that are separated by a dielectric adhesive. Any such discrete capacitor is considerably smaller than the capacitor that would be needed in the absence of the cross-over self-capacitances.

These and other features and advantages of the invention will be apparent to those skilled in the art from the following detailed description, take together with the accompanying drawings.

DETAILED DESCRIPTION OF THE INVENTION

Rather than laminating the transducer between plastic sheets or providing the antenna coil on opposite faces of a substrate as previously, the present invention places all of the transducer components on one side of a substrate. This leaves the opposite side of the substrate free to be used for attachment to an object to be identified. Furthermore, a specially modified antenna configuration makes it possible to eliminate, or at least significantly reduce the size of, a separate capacitor that would otherwise be required to establish a resonant operation.

Figure 1:
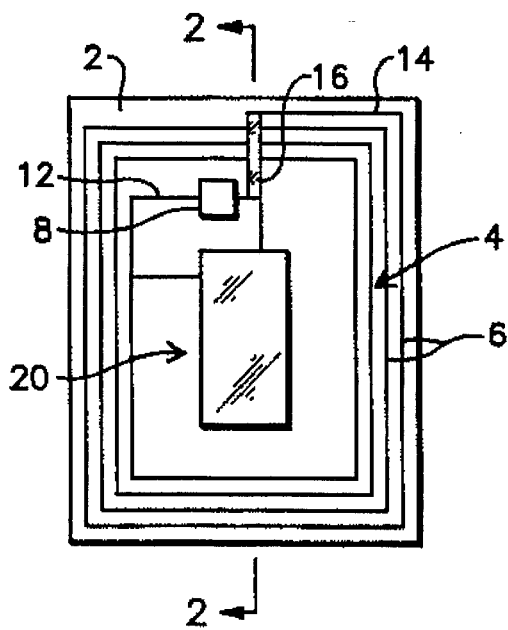
FIG. 1 is a plan view of a transponder incorporating the invention.
Figure 2:
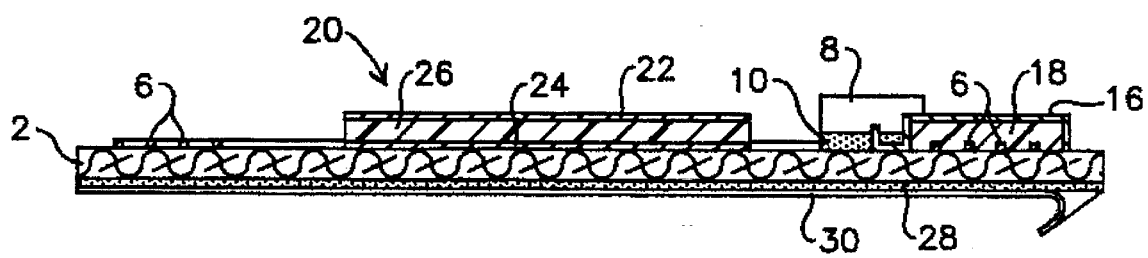
FIG. 2 is a sectional view taken along the section line 2—2 of FIG. 1.

A simplified embodiment of the new transducer is shown in FIGS. 1 and 2, which are not directly to scale. The transducer is fabricated on a flexible dielectric substrate 2 that can be formed for example from paper or a flexible plastic. The substrate size will generally depend upon the required antenna size; a standard 8½×11 inch (21.6×27.9 cm) sheet is suitable for a resonant frequency of 125 KHz.

An antenna coil 4 is fabricated on one side of the sheet around an open central area. The coil is preferably formed from aluminum printed directly on the substrate by stamping or embossing. Although only four antenna turns are illustrated, a typical transponder can have on the order of 100 turns. Typical dimensions for the antenna line 6 are a width of 0.02 inch (0.51 mm) and a height of 0.0007 inch (17.8 micrometers).

An IC chip 8 that is secured to the substrate by a suitable adhesive 10 includes a memory section with an identification code for uniquely identifying an object to which the transponder is attached. The code can either be stored in the chip during its fabrication, or written into the chip later in the case of a writable memory. The coil 4 energizes the chip when it receives an interrogation signal, and rebroadcasts an identification code transmission back to a receiver (which is commonly integrated into the interrogator, also referred to as an exciter/receiver or reader).

The inner end 12 of the coil is connected directly to the IC chip, while its outer end 14 is connected by a lead line 16 that crosses over the intervening coil turns to provide a second energizing input to the chip 8. As described in further detail below, the lead line 16 is considerably wider than the width of the antenna line in any individual turn. It is separated from the antenna coil by a dielectric layer 18, thus forming a capacitive element at each crossover site between the lead 16 and an underlying coil line 6. The dielectric 18 can be implemented either as a dielectric adhesive, or as a thin film dielectric with a thin adhesive on opposite sides to secure the lead line 16 over the coil.

The width of the lead 16 and the thickness and dielectric constant of the dielectric layer 18 are preferably selected to establish a collective cross-over capacitance that, together with the coil's inductance, establishes resonance at a desired transmission frequency, such as 125 or 400 KHz. However, in the case of a small substrate such as 1.5×1.5 inch (3.8×3.8 cm), the cross-over capacitance might not be great enough for resonance. In that case a discrete capacitor 20 formed from upper and lower metal foil plates 22 and 24 and an intervening dielectric layer 26 can be provided on the same side of the substrate as the coil 4, within the coil turns. The lower plate of this optional capacitor is secured to the substrate 2 by a suitable adhesive. Its opposite plates are connected to the same chip inputs as the inner coil end 12 and the lead line 16, so that the discrete capacitance adds to the sum of the crossover capacitances.

All of the elements described thus far are formed on the same side of the substrate 2, and except for the small IC chip 8 they are all thin enough to allow the substrate to be flexed. The chip 8 is small enough so that it does not significantly interfere with the substrate flexibility. The opposite side of the substrate from the transponder elements is coated with an adhesive 28 that allows the transponder to be adhered to an object for identification purposes. The adhesive 28 is covered with a sheet of glossy peel-off paper 30 or other suitable removable covering that exposes the adhesive only when it is desired to attached the transponder to a particular object. Once the sheet 30 has been removed, the transponder can be adhered, for example, to a piece of luggage that is moved on a conveyor belt past an interrogator in an airport automated luggage handling system for identification and movement to the proper location. The binding strength of the adhesive 28 is preferably selected to ensure that the transponder remains on the luggage during transit, but is low enough for the transponder to be peeled away from the luggage when desired.

Figure 3:
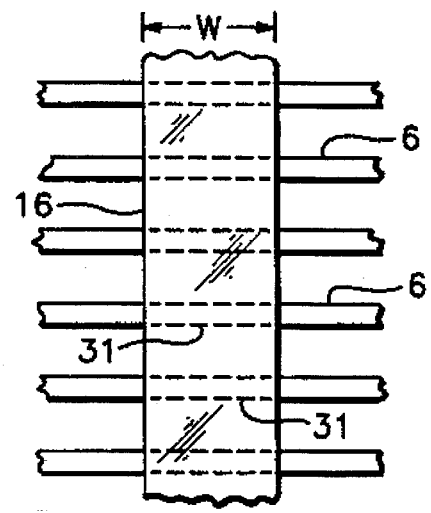
FIG. 3 is an enlarged fragmentary plan view illustrating the self-capacitance antenna crossovers used by the invention.

FIG. 3 is an exploded view illustrating a portion of the antenna coil, with the lead line 16 crossing over a series of coil lines 6. Although only six coil lines are illustrated, a typical winding might include on the order of 100 turns. The width W of the lead line 16 is generally at least ten times the width of the individual coil lines. It is preferably selected to produce a collective cross-over capacitance that, together with the coil's inductance, sets the coil's resonant frequency at the interrogation frequency; the cross-over areas 31 are indicated by shading in the drawing. For example, assume that the coil has 100 turns, the dielectric 18 between the lead line and the underlying coil is 0.001 inch (25 micrometers) thick with a dielectric constant (K) of 3.2, the operating frequency is 125 KHz and the coil inductance is 3 millihenries. Working from the standard formula for resonant frequency $f = 1/2\pi\sqrt{LC}$, the desired capacitance for resonance is 53.56 picofarads. Assuming further that the width of each coil turn is 0.02 inch (0.51 mm), the lead width W can be determined from the standard formula for a two-plate capacitor: $C=0.225$ kA/t, where A is the plate area in square inches and t is the dielectric thickness in inches ($C=0.0885$ kA'/t', where A' is the plate area in cm$^2$ and t' is the dielectric thickness in cm). With the equivalent "plate" area equal to the number of crossovers multiplied by the product of W and the width of each coil turn, the desired W for resonance is 0,372 inches (0.945 cm).

Figure 4:
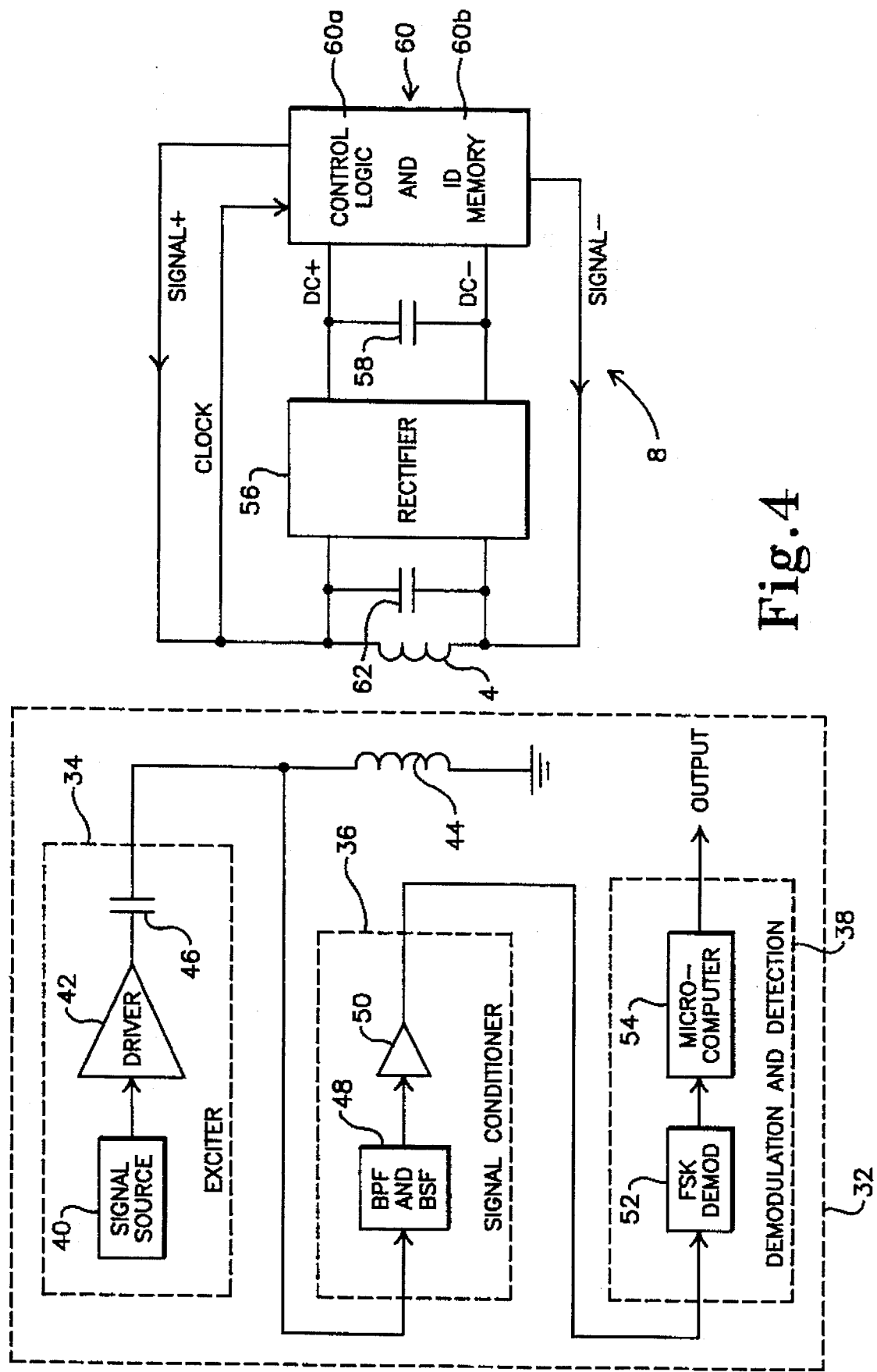
FIG. 4 is a partially schematic block diagram of an RF communication system that can be used with the invention.

The IC chip 8 can generate an identification code in a conventional manner, such as that described in U.S. Pat. No. 4,730,188 to Milheiser. A suitable communications system, similar to that described in the Milheiser patent, is shown in block diagram form in FIG. 4. Various available exciter/receivers can be used, such as the MINIREADER or MAXIPROX readers by Hughes Identification Devices, Inc. The exciter/receiver 32 is shown as consisting of three main functional units: an exciter 34, signal conditioner 36 and demodulation and detection circuits 38. The exciter 34 includes an AC signal source 40, followed by a power driver 42 that provides a high current excitation signal to an interrogator antenna coil 44 through a capacitor 46. The interrogator coil 44 and the capacitor 46 are selected to establish a series resonant circuit that resonates with minimum impedance and maximum current at the excitation signal frequency.

The signal conditioner 36 connects to the interrogator coil 44 and serves to amplify the identification signal returned from the transponder, while filtering out the excitation signal frequency as well as other noise and undesired signals outside the frequency range used by the transponder signals. It includes a bandpass filter/bandstop filter 48 that actively passes the identification code signal frequencies returned from the transponder and passively excludes the high energy at the excitation frequency, and an amplifier 50.

The amplified output of the signal conditioner 36 is fed to the demodulation and detection unit 38, which includes a frequency shift keyed (FSK) demodulator 52 and a microcomputer 54. The FSK demodulator 52 is a phase-locked loop circuit configured as a tone decoder which gives a digital output as the signal from the transponder shifts between two frequencies. The microcomputer 54 extracts the identification code from this digital output by observing the timing of transitions between the two logic levels. The identification code obtained by the microcomputer 54 can be transferred to a display or printer, sent over communication lines to a remote point, stored on tape, disk or other storage medium, or sent to another computer.

The transponder includes the antenna coil 4, which receives magnetic flux generated by the interrogator coil 44 and couples energy at the exciter frequency into the transponder. This energy is converted to a DC voltage using a full-wave rectifier bridge 56 and a smoothing capacitor 58. This DC voltage supplies the power to a control logic and identification memory circuit 60.

The control logic 60 consists of counters and gates which sequentially read out the contents of the identification memory 60b. The logic 60a also inserts a sync word into the signal data stream to allow the exciter/receiver to synchronize to the data. The excitation signal which appears on the transponder coil 4 is supplied to the control logic to provide a clock signal. The control logic circuit 60a converts the serial data and sync stream into a frequency shift keyed (FSK) waveform, which is connected to the transponder coil 4 through complementary current syncs, to transmit the FSK identification signal. The transmitted signal is received by the interrogator coil 44 due to the mutual inductance between it and the transponder coil 4, and is amplified by the signal conditioner and detected. The components of the exciter/receiver 32 can be implemented as either different units which are connected to one another, or wired together as a single unit.

The sum of the various crossover capacitances is represented by a single collective capacitor 62 connected in parallel with the transponder winding 4. Although theoretically the transponder could operate without a resonant circuit in the presence of a sufficiently strong exciting field, the establishment of a resonant operation allows for a much more efficient coupling of excitation energy into the transponder. This in turn makes if practical to locate the exciter/receiver 32 a substantial distance away from the transponders.

While a particular embodiment of the invention has been shown and described, numerous variations and alternate embodiments will occur to those skilled in the art. Accordingly, it is intended that the invention be limited only in terms of the appended claims.

I claim:

1. An RF radio frequency transponder, comprising:

a substrate, an electrical transponder circuit on said substrate, an antenna coil on said substrate formed from multiple turns of an antenna line, with spaced locations on said antenna connected to couple an RF input signal to said circuit, one of said antenna locations being connected to said circuit through a lead that extends along a path that includes crossovers of the antenna turns, and a dielectric material separating said lead from said antenna turns at said crossovers to produce cross-over capacitances between said lead and said antenna turns, the width of said lead being substantially greater than the width of said antenna line at said crossovers to yield cross-over capacitances that collectively establish a resonant frequency for communicating with said circuit through said antenna coil at a predetermined RF frequency.

2. The RF transponder of claim 1, wherein said lead is at least ten times wider than said antenna line.

3. The RF transponder of claim 1, said transponder circuit including a capacitor that adds to said crossover capacitances to establish said resonant frequency for the transponder.

4. The RF transponder of claim 3, wherein said capacitor is discrete from the remainder of said circuit.

5. The RF transponder of claim 4, wherein the remainder of said circuit is fabricated on an IC inte-grated circuit chip that is adhered to said substrate.

6. The RF transponder of claim 4, said capacitor comprising a pair of conductive sheets, with one of said sheets adhered to said substrate and the other sheet adhered to the first sheet by a dielectric adhesive, said capacitor having a substantially larger area than the remainder of said circuit.

7. The RF transponder of claim 6, wherein said circuit, antenna coil, antenna lead and capacitor are all located on the same side of said substrate.

8. The RF transponder of claim 1, wherein said transponder circuit stores an identification code that is read out by energizing said antenna coil with an RF signal at said predetermined RF frequency.

9. The RF transponder of claim 1, wherein said circuit, antenna coil and antenna lead are all located on the same side of said substrate.

10. The RF transponder of claim 9, further comprising an adhesive on the opposite side of said substrate from said circuit, antenna coil and antenna lead.

11. The RF transponder of claim 10, further comprising a peel-off cover over said adhesive.

12. The RF transponder of claim 10, wherein said substrate is formed from a flexible material.

13. The RF transponder of claim 10, wherein said circuit is fabricated on an IC inte-grated circuit chip that is adhered to said substrate.

14. An RF transponder, comprising:

a substrate, an electrical circuit on said substrate that includes a memory storage for an identification code, a multi-turn antenna on the same side of said substrate as said circuit, said antenna communicating with said circuit to energize the circuit and to radiate an identification code stored in said memory in response to a received RF signal at a predetermined resonant frequency, a capacitor on the same side of said substrate as said circuit, said capacitor formed by a lead that is electrically connected to said antenna and crosses over the turns of said antenna on the same side of said substrate as said antenna to produce crossover capacitances between said lead and said turns, thereby to collectively establish a resonant frequency for said transponder, and an adhesive on the opposite side of said substrate from said circuit and antenna for adhering the transponder to a body to be identified.

15. The RF transponder of claim 14, further comprising a peel-off cover over said adhesive.

16. The RF transponder of claim 14, wherein said substrate is formed from a flexible material.

17. The RF transponder of claim 14, wherein said circuit is fabricated on an IC inte-grated circuit chip that is adhered to said substrate.

* * * * *